United States Patent
Robin et al.

(10) Patent No.: US 9,739,325 B2
(45) Date of Patent: Aug. 22, 2017

(54) BRAKE ACTUATOR FOR AIRCRAFT WHEEL HYDRAULIC BRAKE

(71) Applicant: MESSIER-BUGATTI-DOWTY, Velizy Villacoublay (FR)

(72) Inventors: Jean-Baptiste Robin, Velizy-Villacoublay (FR); Robin Lucienne, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/945,660

(22) Filed: Nov. 19, 2015

(65) Prior Publication Data
US 2016/0169309 A1 Jun. 16, 2016

(30) Foreign Application Priority Data
Dec. 12, 2014 (FR) ...................... 14 62376

(51) Int. Cl.
*F16D 65/54* (2006.01)
*F16D 65/74* (2006.01)
(Continued)

(52) U.S. Cl.
CPC .............. *F16D 65/74* (2013.01); *B64C 25/42* (2013.01); *B64C 25/44* (2013.01); *F16D 55/40* (2013.01);
(Continued)

(58) Field of Classification Search
CPC ........ F16D 55/226; F16D 65/18; F16D 65/38; F16D 65/48; F16D 65/54; F16D 2121/02;
(Continued)

(56) References Cited

U.S. PATENT DOCUMENTS

| 2,551,251 A | * | 5/1951 | Du Bois | F16D 65/54 188/71.8 |
| 2,830,680 A | * | 4/1958 | Hawley | F16D 65/54 188/152 |

(Continued)

FOREIGN PATENT DOCUMENTS

| EP | 2 868 944 A1 | 5/2015 |
| FR | 2 820 794 A1 | 8/2002 |

OTHER PUBLICATIONS

French Preliminary Search Report for FR 1462376 dated Jul. 29, 2015.

*Primary Examiner* — Thomas Irvin
(74) *Attorney, Agent, or Firm* — Sughrue Mion, PLLC

(57) ABSTRACT

The invention relates to a brake actuator for an aircraft hydraulic brake, which is intended to be added into one of the cavities of a brake ring, the actuator comprising a liner (1) designed to be housed sealingly in the cavity of the ring, a piston (3) mounted to slide sealingly in the liner along an axis of sliding (X) so as to apply a braking force on friction pads when a fluid is introduced under pressure into the cavity, and having a determined operational travel, a wear compensation device (10) which defines a position to which the piston retreats into the liner by means of a mobile stop (11) that can be moved forward by the piston as a braking force is applied, and an elastic return member (16) returning the piston towards the retracted position bearing against the mobile stop. According to the invention, the mobile stop is reduced to a friction member rubbing against the liner, such that one of the faces of the friction member serves as a stop defining the retracted position of the piston, and the other of the faces serves as a support for the elastic return member, the elastic member having, when compressed, a sufficient increase in force in order to be able to push back the mobile stop in the event that the piston is not in contact with the (Continued)

friction pads while its operational travel is already exhausted.

4 Claims, 2 Drawing Sheets

(51) Int. Cl.
  *B64C 25/42* (2006.01)
  *F16D 55/40* (2006.01)
  *F16D 65/44* (2006.01)
  *B64C 25/44* (2006.01)
  *F16D 65/38* (2006.01)
  *F16D 121/02* (2012.01)
  *F16D 55/226* (2006.01)
  *F16D 65/48* (2006.01)
  *F16D 65/18* (2006.01)
  *F16D 125/04* (2012.01)
  *F16D 125/06* (2012.01)
  *F16D 129/02* (2012.01)

(52) U.S. Cl.
  CPC ........... *F16D 65/186* (2013.01); *F16D 65/44* (2013.01); *F16D 65/54* (2013.01); *F16D 55/226* (2013.01); *F16D 65/18* (2013.01); *F16D 65/38* (2013.01); *F16D 65/48* (2013.01); *F16D 2121/02* (2013.01); *F16D 2125/04* (2013.01); *F16D 2125/06* (2013.01); *F16D 2129/02* (2013.01)

(58) Field of Classification Search
  CPC ........ F16D 65/74; F16D 65/186; F16D 65/44; F16D 55/40; F16D 2125/04; F16D 2125/06; F16D 2129/02
  USPC ....................................................... 188/71.8
  See application file for complete search history.

(56) References Cited

U.S. PATENT DOCUMENTS

| | | | | |
|---|---|---|---|---|
| 2,957,551 A * | 10/1960 | Nahodil | ............... | F16D 65/54 188/152 |
| 4,345,674 A * | 8/1982 | Vacval | ............... | F16D 65/18 188/196 P |
| 4,529,068 A * | 7/1985 | Gallo | ............... | F16D 65/543 188/196 P |
| 5,052,277 A * | 10/1991 | Wirth | ............... | F16D 65/18 92/107 |
| 5,358,078 A * | 10/1994 | Gajek | ............... | B62L 1/00 188/26 |
| 5,465,816 A * | 11/1995 | Moore | ............... | F16D 65/54 188/196 P |
| 6,016,892 A * | 1/2000 | Berwanger | ............... | F16D 65/18 188/71.8 |
| 6,161,658 A * | 12/2000 | Becocci | ............... | B62L 1/00 188/196 M |
| 6,766,886 B2 * | 7/2004 | Bendtsen | ............... | F16D 65/18 188/196 P |
| 7,344,006 B2 * | 3/2008 | Edmisten | ............... | F16D 55/36 188/206 R |
| 7,448,477 B2 * | 11/2008 | Kingston | ............... | F16D 13/757 188/196 R |
| 8,689,947 B2 * | 4/2014 | Isono | ............... | F16D 65/18 188/71.8 |
| 8,893,860 B2 * | 11/2014 | Ohnogi | ............... | F16D 55/40 188/71.5 |
| 2009/0145701 A1 * | 6/2009 | Piccoli | ............... | F16D 65/18 188/71.8 |
| 2010/0012440 A1 * | 1/2010 | Vu | ............... | F16D 65/186 188/72.3 |
| 2011/0094834 A1 * | 4/2011 | Burgoon | ............... | F16D 65/54 188/72.3 |
| 2011/0308898 A1 * | 12/2011 | Shiraki | ............... | B60T 13/741 188/72.4 |
| 2012/0125723 A1 * | 5/2012 | Wong | ............... | F16D 65/18 188/72.3 |
| 2015/0122594 A1 | 5/2015 | Lucienne et al. | | |
| 2016/0176518 A1 * | 6/2016 | Eyanga | ............... | F16D 55/41 188/151 R |

* cited by examiner

BRAKE ACTUATOR FOR AIRCRAFT WHEEL HYDRAULIC BRAKE

The invention relates to a brake actuator for an aircraft wheel hydraulic brake.

TECHNICAL BACKGROUND OF THE INVENTION

The hydraulic brakes used for braking the wheels of aircraft generally comprise a ring having multiple cavities in which brake actuators are housed removably. Each of the actuators comprises a liner which is sealingly added to one of the cavities of the ring and in which a piston is mounted to slide sealingly along an axis of sliding. The ring distributes hydraulic fluid under pressure to all its cavities, which fluid acts on the piston in order to cause it to deploy and apply a braking force to friction pads extending opposite the ring, rotors of which rotate with the wheels and stators of which are prevented from rotating.

In general, the piston has an operational travel that it covers when a braking force is applied. This operational travel, of the order of a few millimeters, is enough to allow the braking force to be applied to the friction pads and to cause the push-rod to retreat to allow the rotors to rotate freely. To this end, a spring extending inside the piston ensures that the push-rod retreats into a retracted position when the braking force is no longer applied.

However, the friction pads gradually become worn as a result of repeated application of braking forces so it is important to ensure that the piston is always near the friction pads. In order to achieve this it is known practice to fit the brake actuators with a wear compensation device that extends inside the piston. The wear compensation device comprises a mobile stop which is mounted to slide with friction along the axis of sliding on a central rod extending into the piston and which defines the position to which the piston retreats.

When a braking force is applied, the piston is pushed towards the friction pads and, if necessary, carries the mobile stop along with it, overcoming the friction between the rod and the stop, thereby causing the mobile stop to move forward along the central rod. When the force is released, the spring, which extends between the mobile stop and the piston, causes the piston to retreat as far as the new retracted position, which has moved forward because the mobile stop has moved forward.

There is known, from FR2820794, a brake actuator which is illustrated in FIG. 6B, in which the wear compensation device comprises a mobile stop (182, 184) whose friction member (the friction rings 182) acts directly on the wall of the liner.

OBJECT OF THE INVENTION

It is an object of the invention to propose a brake actuator for an aircraft hydraulic brake that has a simplified structure.

PRESENTATION OF THE INVENTION

In order to achieve this goal, there is proposed a brake actuator for an aircraft hydraulic brake, which is intended to be added into one of the cavities of a brake ring, the actuator comprising
  a liner designed to be housed sealingly in the cavity of the ring;
  a piston mounted to slide sealingly in the liner along an axis of sliding so as to apply a braking force when a fluid is introduced under pressure into the cavity;
  a wear compensation device which defines a position to which the piston retreats into the liner by means of a mobile stop that can be moved forward by the piston as a braking force is applied;
  an elastic return member returning the piston towards the retracted position bearing against the mobile stop;
in which, according to the invention, the mobile stop is reduced to a friction member rubbing against the liner, such that one of the faces of the friction member serves as a stop defining the retracted position of the piston, and the other of the faces serves as a support for the elastic return member, the elastic member having, when compressed, a sufficient increase in force in order to be able to push back the mobile stop in the event that the piston is not in contact with the friction pads while its operational travel is already exhausted.

Thus, the mobile stop is reduced to its simplest form, the friction member forming on one hand the mobile stop which arrests the piston in the retracted position, and on the other hand a support for the elastic return member which thus acts directly on the friction member. The actuator of the invention thus has a greatly simplified structure.

Any type of elastic member can be used, provided that it has, when compressed, a sufficient increase in force in order to be able to push back the mobile stop in the event that the piston is not in contact with the friction pads while its useful travel is already exhausted. In particular, and according to a particular aspect of the invention, the elastic member is an elastic spring whose coils can meet under the force applied by the fluid under pressure. Thus compacted, the helical spring behaves like a non-deformable solid able to push the mobile stop.

BRIEF DESCRIPTION OF THE DRAWINGS

The invention will be better understood in the light of the following description given with reference to the figures of the attached drawings, among which.

DETAILED DESCRIPTION OF THE INVENTION

Figure 1:
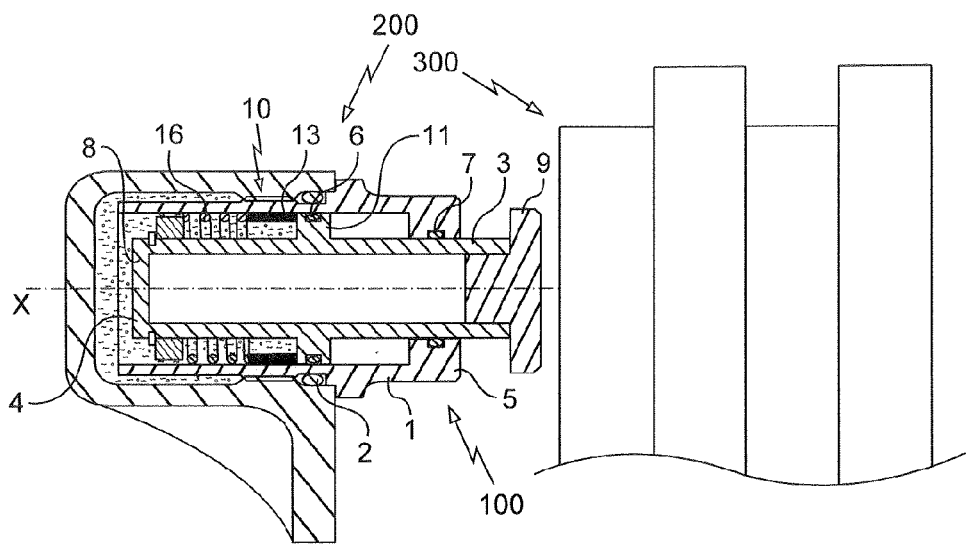
FIG. 1 is a view in section of a brake actuator according to the invention, illustrated in place in a ring of an aircraft hydraulic brake at rest.

With reference to FIG. 1, the brake actuator 100 of the invention is intended to be housed in one of the cavities 200 of a ring of an aircraft hydraulic brake, which moreover comprises friction pads 300 comprising a succession of rotor discs and stator discs, for example discs made of carbon, on which the actuator selectively applies a braking force when pressurized fluid (illustrated as dots) is admitted to the cavity 200.

The actuator 100 first of all comprises a generally cylindrical liner 1 which is housed sealingly inside the cavity 200 of the ring. For that purpose, a seal 2 collaborates with an external face of the liner to contain the hydraulic fluid within the cavity.

A piston 3 is mounted to slide in the liner 1 along an axis of sliding X. To that end, the piston 3 comprises a protrusion 11 that is shaped like a bearing which fits closely against an internal face of the liner 1 and which receives a seal 6. The distal end 5 of the liner 1 is shaped as a bearing to guide the piston 3. The distal end 5 of the liner 1 is fitted with a scraper 7.

It will be noted that the proximal end 4 of the piston 3 is in this instance closed by a wall 8 formed as an integral part of the piston, so as to confine the hydraulic fluid in a zone distant from the discs 300. The distal end of the piston 3 accommodates a shoe 9 to apply pressure to the discs 300.

The actuator 100 is provided with a wear compensation device, which, according to the invention, extends between the liner 1 and the piston 3. The wear compensation device 10 is in this case reduced to a friction ring 13 which rubs against the internal face of the liner 1.

One of the faces of the friction ring 13 (oriented towards the distal end 5 of the liner 1) serves as a stop to define the retracted position of the piston 3. The retracted position is defined by the protrusion 11 coming into contact against the friction ring 13. The other of the faces of the friction ring 13 (oriented towards the proximal end 4 of the piston 3) serves as a support for a return spring 16 returning the piston 3 towards the retracted position. The spring 16 thus acts directly on the friction ring 13.

Figure 2:
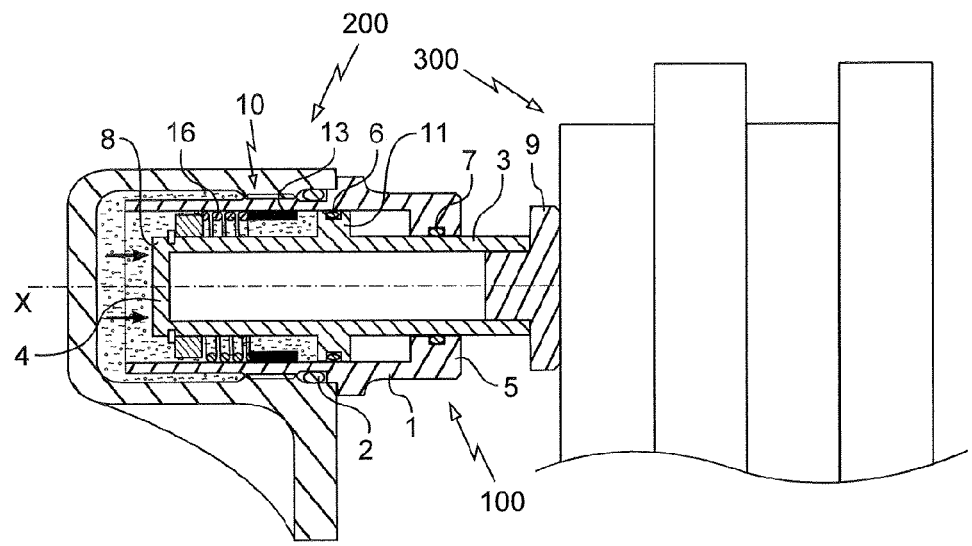
FIG. 2 is a figure similar to FIG. 1, the actuator being illustrated as a standard braking force is being applied, the operational travel of the piston being not entirely exhausted.

The way in which the brake actuator of the invention works is as follows. Starting from the retracted position illustrated in FIG. 1, a braking force is applied by admitting the pressurized fluid to the cavity 200. The fluid pushes the piston 3 towards the discs 300, counter to the force of the spring 16. The piston 3 then applies a pressing force on the discs 300, as illustrated in FIG. 2.

Figure 3:
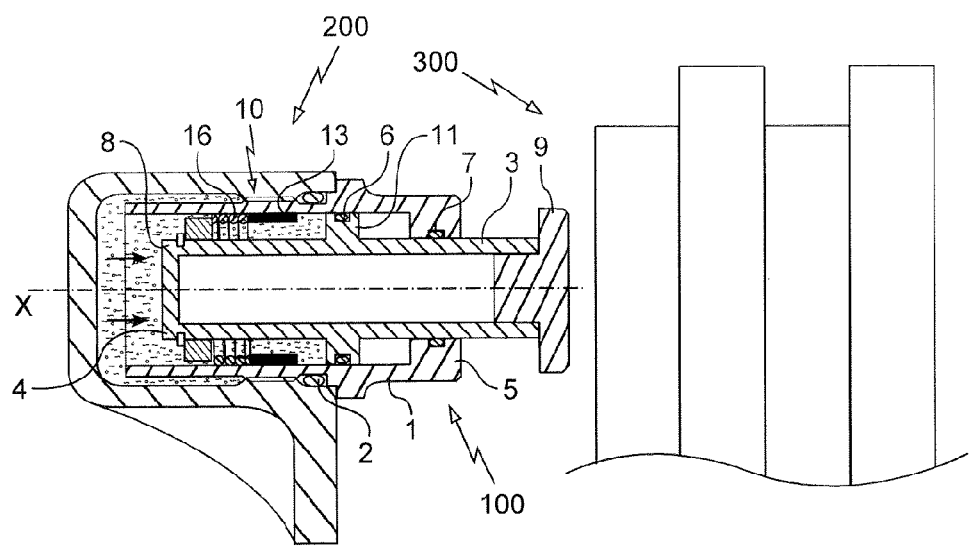
FIG. 3 is a figure similar to FIG. 2, the actuator being illustrated as a braking force is being applied, the operational travel of the piston being entirely exhausted before the piston comes into contact with the discs.
Figure 4:
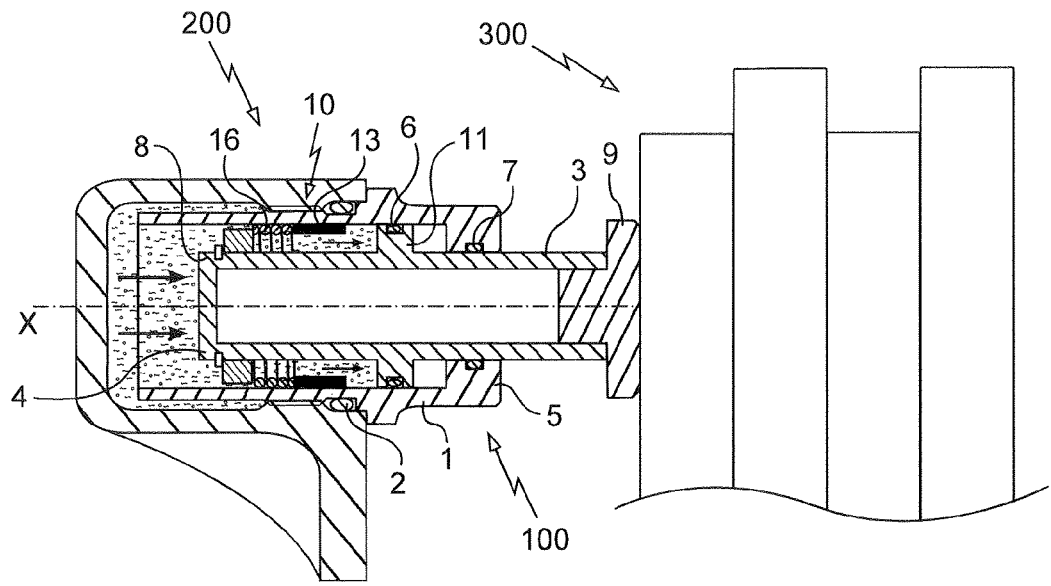
FIG. 4 is a figure similar to FIG. 3, showing the forward movement of the mobile stop in order that the piston can come into contact with the discs.

However, it may be that the distance between the shoe 9 and the discs is greater than the operational travel of the piston 3. In this situation, and as illustrated in FIG. 3, before coming into contact with the discs 300, the piston 3 causes the spring 16 to compress to the point that its coils meet. The spring 16 behaves as a non-deformable solid and pushes the friction ring 13 counter to the friction generated by the latter against the liner 1, until the piston 3 comes into contact with the discs 300, as illustrated in FIG. 4.

Figure 5:
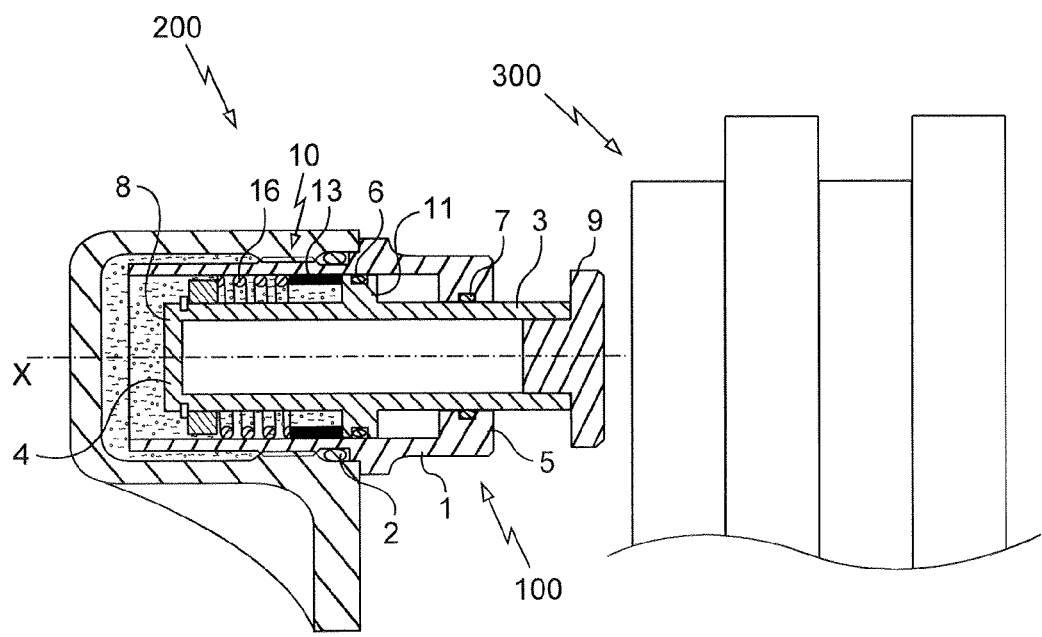
FIG. 5 is a figure similar to FIG. 4, the actuator being illustrated after the braking force has been released.

Then, when the braking force is released, the piston 3 moves back under the effect of the spring 16 until the piston 3 abuts against the opposing face of the friction ring 13, as illustrated in FIG. 5, thus defining a new retracted position, further forward in relation to the previous one. The operational travel of the piston (between the position of FIG. 4 and the position of FIG. 5) is unchanged, only the retracted position having moved forward slightly in order to compensate for the wearing of the discs 300.

The invention is not restricted to that which has just been described but on the contrary encompasses any variant that falls within the scope defined by the claims. In particular, although the friction member which constitutes on its own the mobile stop is in this case a friction ring, it is possible to use other types of friction member such as a spiral friction segment, or furthermore a succession of friction washers. Although the elastic return member is in this case a helical spring, any other elastic member can be used, provided that it has, when compressed, a sufficient increase in force in order to be able to push back the mobile stop in the event that the piston is not in contact with the friction pads while its operational travel is already exhausted.

The invention claimed is:

1. A brake actuator for an aircraft hydraulic brake, which is intended to be added into one of the cavities of a brake ring, the actuator comprising:
   a liner (1) designed to be housed sealingly in the cavity of the ring;
   a piston (3) mounted to slide sealingly in the liner along an axis of sliding (X) so as to apply a braking force on friction pads when a fluid is introduced under pressure into the cavity, and having a determined operational travel between a retracted position and a position where the operational travel is exhausted;
   a wear compensation device (10) which defines a position to which the piston retreats into the liner by means of a mobile stop (13) that can be moved forward by the piston as a braking force is applied; and
   an elastic return member (16) returning the piston towards the retracted position bearing against the mobile stop;
   wherein the mobile stop is constituted by a friction member (13) rubbing against the liner, such that one face of the friction member serves as a stop defining the retracted position of the piston, and another face serves as a support for the elastic return member, the elastic member being operative, when compressed by the piston, to push back the mobile stop in the event that the piston is not in contact with the friction pads while its operational travel is already exhausted.

2. The brake actuator according to claim 1, in which the piston has a proximal end (4) that is closed and fluid tight.

3. A brake actuator for an aircraft hydraulic brake, which is intended to be added into a cavity of a brake ring, the actuator comprising:
   a liner (1) designed to be housed sealingly in the cavity of the ring;
   a piston (3) mounted to slide sealingly in the liner along an axis of sliding (X) so as to apply a braking force on friction pads when a fluid is introduced under pressure into the cavity, and having a determined operational travel between a retracted position and a position where the operational travel is exhausted; and
   a wear compensation device (10) which defines a position to which the piston retreats into the liner by means of a mobile stop (13) that can be moved forward by the piston as a braking force is applied; and
   an elastic return member (16) returning the piston towards the retracted position bearing against the mobile stop;
   wherein the mobile stop is constituted by a friction member (13) rubbing against the liner, such that one face of the friction member serves as a stop defining the retracted position of the piston, and another face of the friction member serves as a support for the elastic return member, the elastic return member being operative, when compressed by the piston, to push back the mobile stop in the event that the piston is not in contact with the friction pads while its operational travel is already exhausted, and in which the elastic return member is a helical spring (16) whose coils meet during application of the braking force if an operational travel of the piston is exhausted before the piston touches the friction pads.

4. The brake actuator according to claim 3, in which the piston has a proximal end (4) that is closed and fluid tight.

\* \* \* \* \*